United States Patent [19]
Coles et al.

[11] Patent Number: 5,455,697
[45] Date of Patent: Oct. 3, 1995

[54] LIQUID CRYSTAL DEVICE

[75] Inventors: Harry J. Coles, Stockport; Jonathon P. Hannington, Mid Glamorgan; David R. Thomas, Barry, all of United Kingdom

[73] Assignee: Dow Corning Limited, Barry, Wales

[21] Appl. No.: 185,551

[22] Filed: Jan. 21, 1994

[30] Foreign Application Priority Data

Jan. 30, 1993 [GB]  United Kingdom .................. 9301895

[51] Int. Cl.$^6$ ........................... G02F 1/13; C09K 19/52; C09K 19/12
[52] U.S. Cl. ............... 359/103; 252/299.01; 252/299.66
[58] Field of Search ....................... 252/299.01, 299.66; 359/103

[56] References Cited

U.S. PATENT DOCUMENTS

| | | | |
|---|---|---|---|
| 4,293,435 | 10/1981 | Portugall et al. | 252/299.01 |
| 4,358,391 | 11/1982 | Finkelmann et al. | 252/299.01 |
| 4,981,607 | 1/1991 | Okawa et al. | 252/299.01 |
| 5,106,530 | 4/1992 | Haas et al. | 252/299.6 |
| 5,138,010 | 8/1992 | Keller et al. | 528/26 |
| 5,259,987 | 11/1993 | McCardle et al. | 252/299.01 |
| 5,316,693 | 5/1994 | Yuasa et al. | 252/299.01 |

FOREIGN PATENT DOCUMENTS

| | | |
|---|---|---|
| 322703 | 7/1989 | European Pat. Off. . |
| 478034 | 4/1992 | European Pat. Off. . |
| 144491 | 6/1989 | Japan . |
| 268785 | 10/1989 | Japan . |
| 180890 | 7/1990 | Japan . |
| 2146787B | 4/1985 | United Kingdom . |

Primary Examiner—Cynthia Harris
Attorney, Agent, or Firm—James E. Bittell

[57] ABSTRACT

A liquid crystal device wherein the liquid crystal material exhibits a smectic phase and crmoprises at least one siloxane compound having the general formula

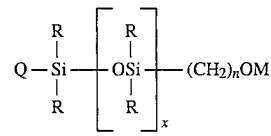

in which R=alkyl, alkenyl or aryl, Q represents a monovalent group, for example alkyl —$(CH_2)_n$OM', a chiral organic group, a dye group, a non-linear optic group or the group —$(CH_2)_n$L in which L represents a siloxane group, M and M' each represent

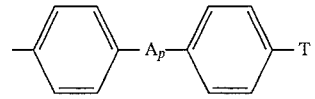

wherein A is carboxyl, T is CN, F or Cl and p=0 or 1, provided that when T is F or Cl x has a value of at least 2.

12 Claims, 1 Drawing Sheet

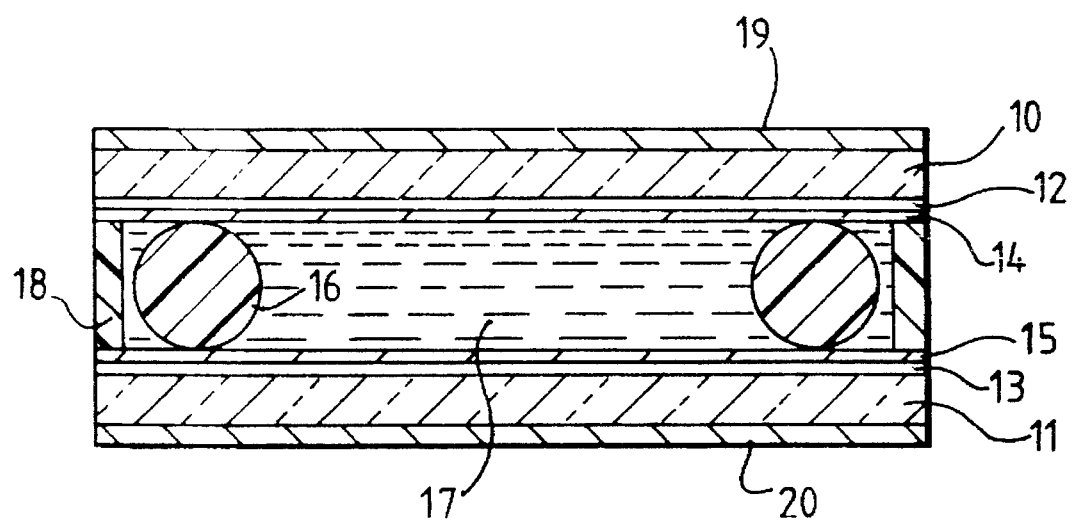

LIQUID CRYSTAL DEVICE

This invention relates to liquid crystal devices. More particularly it relates to electro-optical and opto-optical devices using oligomeric siloxane compounds.

It is well known that monomeric liquid crystals consist of compounds having an elongated or rod-like structure usually with a rigid core. Such molecules, which usually contain a permanent electrical dipole and easily polarisable chemical groups, may exhibit nematic (N), chiral nematic (N*), smectic (S) and chiral smectic (S*) mesophases but on cooling to lower temperatures experience a transition to a solid crystal. This liquid crystal to solid crystal transition destroys the liquid crystalline order. Side chain polymer materials are known which exhibit similar liquid crystalline phases but at lower temperatures undergo a transition from one liquid crystal state to a viscous or glass state thereby storing the liquid crystalline order. Liquid crystal phases, or mesophases, show varying degrees of molecular ordering between the almost perfect three dimensional structure of a crystalline solid which exhibits positional and orientational order and the randomly ordered state of an isotropic fluid.

In the nematic phase (N) all positional order is lost so that the centres of mass of the molecules are arranged randomly in space. The orientational order is, however, maintained so that there is a statistical orientational ordering of the molecules parallel to their long axes. Such phases may have the direction of their alignment altered by the application of mechanical, electrical, optical or magnetic fields. The ability to switch the direction of the alignment gives rise to a display or device element that can be used, for example to display information. Liquid crystal display elements based on the nematic phase are widely used in electro-optical devices such as the displays of digital wrist watches, calculators, word processors, personal computers and the like. However, the nematic liquid crystal material presently used in these displays has problems in terms of its bistability or memory property and of its inapplicability to a high speed switching element.

In the chiral nematic (N*), or cholesteric, mesophase the molecular order is characterised by an orientational order similar to that found in nematics but in this phase the axis direction changes continuously along an axis perpendicular to the first and traces out a helical path. This mesophase requires that the mesogenic material is optically active or contains optically active additives to produce the twisted or chiral nematic mesophase. If the pitch of the helix is of the order of the wavelength of visible light then a characteristic of this N* phase is a bright selective colour reflection. Such chiral nematic mesophases are often used in thermography since slight temperature changes distort the helical pitch and this leads to a change in colour of the reflected, and therefore also, transmitted light.

In a smectic phase the molecular order is characterised by orientational order and two degrees of directional order giving rise to a lamellar structure. Within this broad phase class there are several types of smectic phases depending on whether the centres of mass of the molecules in each layer are randomly arranged (as in a $S_A$ phase) or ordered between themselves (as in a $S_B$ phase), whether the lamellar layers are correlated or whether the orientational order is tilted at some angle to the layer normal as might be the case for a $S_C$ phase. Smectic phases may be aligned in electrical, magnetic, mechanical or optical fields to give devices with a memory or information storage capability. In the case of low molar mass compounds this memory effect is mechanically fragile whilst in the case of polymers the memory is robust but the response time is much slower.

In a chiral smectic phase ($S_C^*$) the orientational order is normally inclined to the layer normal, as in a $S_C$ phase, but the direction of the orientation changes continuously along the axis of the layer normal thereby tracing out a helical path rather like a corkscrew. Various chiral smectic phases exist depending on the type of orientational order within the layer. Such chiral mesophases normally exhibit ferroelectric properties and it is known that a liquid crystal display element containing such a chiral mesophase, a so-called ferroelectric, is capable of high speed response, in the order of 10 microseconds, and has a memory property.

Low molar mass liquid crystals having chiral and non-chiral nematic or smectic structures are known and because of their optical and electrical properties have found many technological uses especially in the opto-electronics field. However, the known materials have some limitations on their performance which restricts their ultimate applicability.

Recently much work has gone into the study of low molar mass (LMM) liquid crystals with electro-optic properties suitable for use at ambient temperatures. Since one highly desirable property was fast electro-optic switching, and because this switching time depends on the cooperative molecular reorientation, attention was focussed on the synthesis of relatively small molecules of low mean viscosity. However, despite the wide range of materials prepared it is only quite recently that electro-optic devices have become firmly established with the discovery of the cyanobiphenyl family of compounds. At lower temperatures these compounds exhibit crystalline phases which limit their response time in the mesomorphic phase and destroy the induced order on cooling from the said mesophase to the crystalline phase. Although LMM liquid crystals have been used for storage of the induced order in, for example a smectic phase, there are a number of disadvantages as follows:

1. the stored information in the smectic phase is often easily lost by mechanical or thermal stress;
2. cooling into the inherent crystal phase destroys the induced order;
3. grey scaling which is the production of different degrees of controlled light transmission or scattering is difficult, and
4. difficulties arise in controlling the alignment on cooling from the isotropic phase since the materials generally prefer to align homeotropically, that is perpendicular to the substrate, rather than predominantly parallel in a high optical contrast scattering state.

Having regard to these disadvantages there exists a need for improvement in such materials.

In liquid crystal polymers the problems of storage may be overcome in a number of ways. For example U.S. Pat. No. 4,293,435 describes a device in which information may be encoded in the cholesteric texture of a liquid crystal polymer and stored by allowing the polymer to cool below its glass transition temperature ($T_g$). The disadvantages are that the polymer must be heated to as much as 200° C. to record the information and that $T_g$ must be above normal ambient temperatures ($T_a$ about 25° C.). Further because of the polymeric nature of the material the viscosity is relatively high and the response times correspondingly slow.

In British Patent 2 146 787B a type of device is described using a different effect in which information is stored in a mesomorphic polymer in a viscous state above $T_g$ and which persists at $T_a$. Above a higher critical temperature ($T_f$) the polymer becomes fluid and the stored alignment may be altered or removed by applying suitable optical, electrical, magnetic, mechanical or thermal fields. Below $T_f$ the alignment or information is stored in a durable manner due to the polymeric nature of the material. Response times are generally slower than for LMM materials and the process of alignment leading to storage of optical information requires local heating of the mesomorphic polymer. The materials do, however, provide very durable storage of alignment at ambient temperatures. The quality of the display and the level of storage may be improved by adding pleochroic dyes, by laser addressing and by using birefringence effects, for example with crossed polarisers, as well as by using controlled scattering effects.

It is an object of the present invention to provide liquid devices wherein the liquid crystals are novel low mass smectic liquid crystal materials using siloxane-containing structures and mixtures containing them. Said devices may be any of a wide variety of opto-optic, magneto-optic, electro-optic and mechanical or thermo-optic storage and non-storage devices.

To date most low molar mass liquid crystals produced have the following general structure:

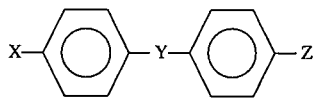

where X is alkyl, O-alkyl or COO alkyl, Y is COO, OOC or biphenyl link and Z is a polar group such as CN or $NO_2$. The properties of such generalised materials have been reviewed in the literature and it is not intended here to be totally comprehensive but to illustrate the general features of a mesogenic low molar mass compound. Materials having liquid crystal properties wherein X in the above formula contains siloxane groups and devices containing such materials have been disclosed in for example EP-A-0 322 703 which relates to a liquid crystal composition comprising a main chain-type mesomorphic polymer and a mesomorphic monomer and showing a smectic phase. It also relates to a liquid crystal device comprising the said liquid crystal composition between a pair of substrates. EP-A- 0 478 034 relates to a homogeneous electrorheological fluid which mainly comprises a liquid crystal compound in which a plurality of liquid crystal groups are bonded to a molecular chain, or comprises a lyotropic liquid crystal comprising a solute and a solvent. The liquid crystal compound may have a siloxane molecular chain. Siloxane-containing chiral smectic liquid crystals are disclosed in JP 01144491 and JP 01268785 and nematic siloxane-containing liquid crystals are disclosed in JP 02180890.

According to the present invention there is provided a liquid crystal device wherein the liquid crystal material exhibits a smectic phase and comprises at least one siloxane compound having the general formula

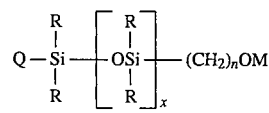

wherein each R represents an alkyl group having from 1 to 12 carbon atoms, an alkenyl group having from 1 to 6 carbon atoms or an aryl group having from 6 to 12 carbon atoms, Q represents a monovalent group selected from alkyl groups having from 1 to 8 carbon atoms, $-(CH_2)_nOM'$, a chiral organic group, a dye group, a non-linear optic group or the group $-(CH_2)_nL$, in which L represents a group selected from $R_3Si[OR_2Si]_y$ and

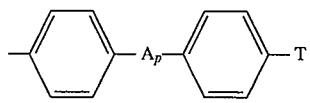

in which each R is as defined hereinabove, each of the remaining free valencies of silicon are satisfied by the group $-(CH_2)_nSiR_2[OSiR_2]_x(CH_2)_nOM$, y is an integer of from 1 to 4 and z is an integer of from 4 to 6, x is an integer from 1 to 10, each n is an integer from 4 to 11 and each M and M', which may be the same or different, represents a mesogenic group having the general formula

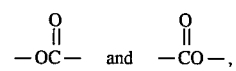

wherein the linkage A is selected from

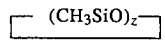

T is selected from CN, Cl and F and P is 0 or 1 provided that when T is F or Cl x has a value of at least 2.

Depending on the meaning given to Q the general formula I represents a molecule having or containing an AB or a BAB configuration, wherein B represents the organic mesogenic moiety and A represent the siloxane portion. For example when Q is alkyl, alkenyl or aryl the molecule has the AB structure. When Q represents the group $-(CH_2)_nOM'$ the molecule is of the BAB configuration. When L represents

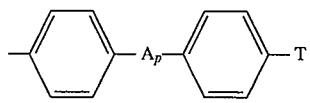

the molecule consists of a plurality of AB structures linked to a cyclic siloxane. For the purpose of this invention compounds having the AB type structure are preferred.

In the general formula hereinabove the R groups are preferably n-alkyl containing 1 to 5 carbon atoms, the preferred terminal group T is —CN or F and the preferred ranges of x and n are from 1 to 4 and from 6 to 11 respectively.

The siloxane-containing liquid crystals employed in the devices of the invention may be prepared by reaction between an organosiloxane oligomer having at least one terminal silicon-bonded hydrogen atom and an alkenyl-terminated mesogen in the presence of a suitable hydrosilylation catalyst, for example a platinum compound or complex. This is represented schematically below for the AB and BAB cases and R=methyl

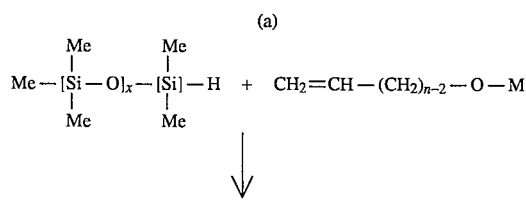

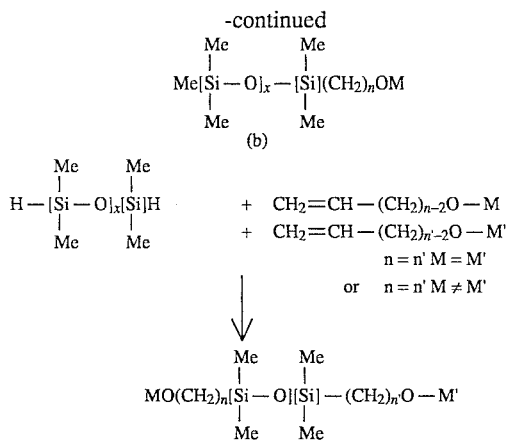

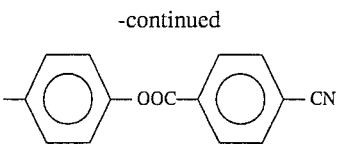

then a preferred liquid crystal liquid material contains compounds such as those described in British Patent 1 433 130 for example of general formula

where t=0 or 1 and R' is alkyl or alkoxy.

Mixtures of molecules of the type defined in Formula I with side chain polymers of the type disclosed in British Patent 2 146 787 may also be employed as they may equally be used to improve or otherwise modify the performance of the compounds of Formula I.

BRIEF DESCRIPTION OF THE DRAWING

The drawing provides a schematic cross-sectional representation of an embodiment of the invention.

The devices of this invention may be of any type which relies on the use of a smectic liquid crystal material for its operation. An example of such a device is illustrated in the accompanying drawing which is a schematic cross-sectional view. The siloxane-containing liquid crystal material (17) is interposed between a pair of substrates (10, 11) which may be constructed of glass or a suitable polymeric material, for example polyethylene terephthalate. The inner surfaces are coated with a transparent conducting film (12, 13) of indium tin-oxide and aligning agent (14, 15). Such surface aligning agents are known to those practiced in the art. Spacers (16) define the film thickness of between 1 and 100μm and these may be polymeric films, photo-etched, glass fibres or glass micro-beads. The substrates are held in place by an adhesive (18) which may also function as a seal and/or a spacer. The conducting film may cover the whole inner surface of the substrate or may be etched into a suitable pattern, for example a dot matrix or a seven segment display. Regions of the film may then be addressed by electrical fields to display information as required. These fields can be applied externally to the electrodes using suitable wave-forms or internally using thin film transistor devices. Equally magnetic fields or thermal addressing using a suitably focused light source, including a laser, may be used to alter the appearance of the device. Appropriate optics and a beam steering system may be used to move the focus around to different regions of the film to write information thereupon. Polarising films (19, 20) may be incorporated, if required, to observe the information.

In the most common display type the smectic liquid crystal material is incorporated in the device of the accompanying drawing without polarisers attached to the substrates. Surface alignment agents may be used to control the field of alignment if required but are not generally necessary. If an alternating current (AC) field is applied across a positive dielectric material the molecules align so that the smectic lamellar layers are parallel to the substrate. In this state the device is optically clear. Application of a low frequency or DC field disrupts the lamellar order and the material aligns in a scattering or focal conic texture. The When L represents the cylic siloxane structure the liquid crystal may be prepared by first reacting a methylalkenyl, for example a methylvinyl, cyclic siloxane with a siloxane oligomer having terminal silicon-bonded hydrogen under conditions whereby one SiH per molecule reacts with each alkenyl group. The product is then reacted with the mesogen having terminal unsaturation in the manner illustrated above.

The siloxane-containing liquid crystals employed according to the invention are those which exhibit smectic phases. The presence of the siloxane unit acts to suppress the crystalline phase of the mesogenic structural elements and can replace them by a glass phase with a very low glass transition temperature $T_g$ thereby improving the response times. Further it has been discovered that the smectic phases have an enhanced structural order that has improved the resistance of the phase to mechanical shock and may serve to improve the grey-scaling capability.

In one embodiment of the invention the group Q may contain a dye moiety. This dye moiety may be pleochroic, fluorescent or optically non linearly active, thereby allowing coloured and/or functional materials to be produced. Equally such dye structures chemically linked to the siloxane-containing molecules or not may be included as guest into liquid crystalline host. Preferred dyes as guests are for example anthraquinone, azo or perylene structures.

An advantage of the siloxane compounds of Formula I is that they exhibit smectic phases without requiring the additional presence of other liquid crystal substances. However, if desired, they may be mixed between themselves or with other low molar mass or polymeric liquid crystals to improve or otherwise modify bulk properties. When used this way they may usefully modify the elastic constants, viscosity coefficients and optical and dielectric properties of the low molar mass (LMM) materials. When mixtures of these types are made improvements can be made to the operating temperature range, the viscosity and the multiplexibility. It is preferred that when used this way the LMM material contains at least one compound having the same or a closely related structural group to M and/or M', for example when M is

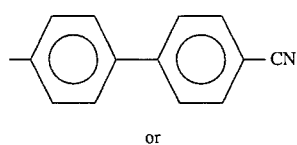

or change from clear to scattering texture provides optical contrast and allows information to be displayed. It has been found that in either state, clear or scattering, the siloxane-containing liquid crystals and mixtures of the present invention are particularly resistant to mechanical shock. A surprising result is that the DC switching time is generally faster than the AC response time.

It has been further discovered that combinations of fields may be applied, such as electrical and thermal, to allow selective erasure and storage of information so that the materials are particularly suited for optical data recording and storage applications. The thermal source may be a low powered laser and it has been discovered that suitable choice of laser energy and/or electric field allow grey scale to be achieved. It has been further discovered that pleochroic dyes may be incorporated into the device to enhance the optical contrast between the clear and scattering states. These dyes may be absorbing or both absorbing and fluorescent, chiral or non-chiral. The dyes generally align in the same direction as the smectic material. The absorbing dyes may be any colour or combination of colours. Black or grey scattering devices have been produced. The use of fluorescent dyes in a scattering state gives rise to a bright semi-emissive device which may be enhanced by the use of a suitable backlighting system. In the clear state the dye does not absorb so the device is neither coloured nor fluorescent. It has been found that the DC switching time may be altered by adding ionic dopants to the mixture or materials of the invention.

Liquid crystal materials for use according to the invention were prepared as follows.

The compound 4-cyano-4'-hexenyloxybiphenyl (3.37 g), prepared by the reaction of 6-bromohex-1-ene with 4-cyano-4-hydroxybiphenyl, was charged to a 2-necked round bottom flask fitted with stirrer, dropping funnel, nitrogen purge and reflux condenser. To the flask was also added toluene (45.0 ml) and, as catalyst, a complex formed between divinyl-tetramethyldisiloxane and chloroplatinic acid. The catalyst was added in sufficient quantity to provide $8.8 \times 10^{-5}$ moles Pt (as metal) per mole of SiH in the pentamethyldisiloxane reactant. The mixture was then heated to 55° C. at which temperature pentamethyldisiloxane (2.00 g 10% excess SiH to mesogen) was added from the dropping funnel over a period of 30 minutes. A slight exotherm occurred. The mixture was maintained at 60° C. for one hour and then raised to reflux temperature for a further 24 hours.

When the reaction mixture had cooled the toluene and excess siloxane were removed employing a rotary evaporator to leave the compound

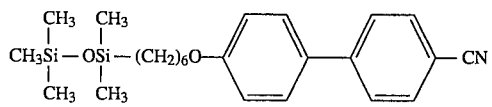

Purification was effected by dissolving the compound in hexane. The insoluble unreacted mesogenic compound was removed by filtration and the hexane then removed by volatilisation at elevated temperature.

Analysis of the oligomeric product by infra-red spectroscopy indicated disappearance of the SiH peak at $2180\ cm^{-1}$. The product was designated Compound C Employing the same general procedure but with suitably modified purification technique (dichloromethane/ methanol in place of hexane) Compounds D, E and F falling within the general formula

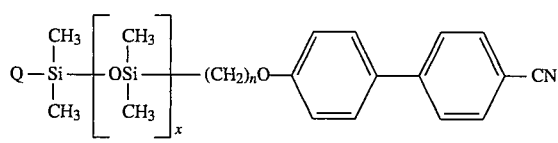

were also prepared wherein

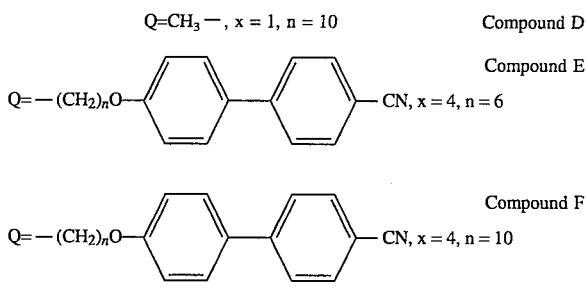

The thermal and electro-optic properties of Compounds C, D, E and F were measured employing apparatus consisting essentially of a BBC personal computer and a polarising microscope fitted with a temperature controlled Mettler hot stage. A photodiode was attached to the eyepiece of the microscope and connected to a photodiode amplifier. The output of the amplifier was fed to the BBC computer. Means were provided for the application of a DC voltage to a cell positioned on the hot stage and containing the compound under examination.

The cells consisted of two parallel thin glass plates separated by microscopic glass beads to enclose a space 7.5 microns thick. The interior surfaces of the cells were coated with indium tin oxide over which was superimposed a rubbed polyimide layer. An area of indium tin oxide was left exposed at two opposite sides of the cell to provide for connection to an electrical source. Samples of the respective compounds were introduced into the cells by a vacuum filling technique. The active area of sample in the cell was 0.25 cm².

Preliminary X-ray examination of the compounds showed that they all exhibited a smectic A phase. The phase transition temperatures were obtained from thermo-optic traces on the BBC computer produced by the output from the photodiode amplifier. Phase transition was indicated by a sudden change in light intensity. The measurements were made at a rate of temperature increase of 0.5° C./minute.

The temperature at which the compounds passed from the smectic A state to the biphasic (smectic and isotropic state) are shown in the following table.

| Compound | Temperature (°C.) |
|----------|-------------------|
| C | 52.7 |
| D | 60.8 |
| E | 55.3 |
| F | 62.8 |

For purposes of comparison Compounds G and H were prepared and purified (dichloromethane/methanol) wherein $Q = -CH_3, x = 1, n = 3$
and -continued

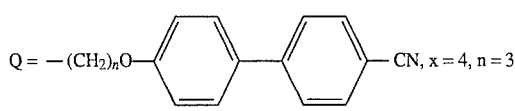
Q = —(CH$_2$)$_n$O—⟨⟩—⟨⟩—CN, x = 4, n = 3 respectively. The phase transition temperatures (smectic to biphasic) for G and H were respectively 35.7° C. and 30.1° C.

Measurement for the DC threshold voltage versus temperature was carried out by applying the voltage in 3 volt steps at 3 second intervals. For the purpose of the experiment threshold voltage was taken to be the voltage at which a 50% change between the maximum and minimum intensity occurs.

Compound C had a threshold DC voltage Vt of 30 v at −11° C. increasing rapidly to 80 v at −12° C. and thereafter slowly to 90 v at −25° C. Compound D had a Vt of 30 v at −14° C. increasing to 55 v at −16° C. and remaining a substantially constant to −25° C.

Compound E had a Vt of about 45 v at −8° C. reaching a constant value of about 75 v at −10° C. Compound F behaved similarly except that the Vt of about 45 v at −15° C. reached a constant value of 60 v at −20° C.

The response times versus applied DC voltage were measured employing an oscilloscope connected between the BBC computer and the photodiode amplifier. Response time was recorded as the time taken for a change in light intensity from 10% to 90% or from 90% to 10%. Compound D showed a response time of about 90 milliseconds at 60 v. Compound F showed a response time of about 150 milliseconds at 60 volts.

That which is claimed is:

1. A liquid crystal device wherein the liquid crystal material exhibits a smectic phase and comprises at least one siloxane compound having the general formula

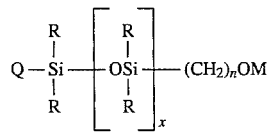

wherein Q represents a monovalent group selected from alkyl groups having from 1 to 8 carbon atoms, —(CH$_2$)$_n$OM', a dye group, or the group —(CH$_2$)$_n$L in which L is

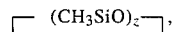

the remaining free valence of each silicon in

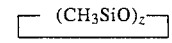

is satisfied by the group —(CH$_2$)$_n$SiR$_2$[OSiR$_2$]$_x$(CH$_2$)$_n$OM and z is an integer from 4 to 6, each x is an integer from 1 to 10, each R represents a group selected from an alkyl group having from 1 to 12 carbon atoms, alkenyl groups having from 2 to 6 carbon atoms and aryl groups having from 6 to 12 carbon atoms, each n is an integer from 6 to 11 and each M and M', which may be the same or different, represents a mesogenic group having the general formula

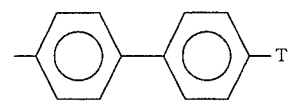

wherein T represents —CN, Cl or F, provided that when T is F or Cl x has a value of at least 2.

2. A liquid crystal device as claimed in claim 1 wherein Q is selected from alkyl groups having from 1 to 8 carbon atoms, a dye group, and the group —(CH$_2$)$_n$L.

3. A liquid crystal device as claimed in claim 2 wherein x is 1 or 2.

4. A liquid crystal device as claimed in claim 1 wherein R is methyl.

5. A liquid crystal device as claimed in claim 1 which comprises a pair of substrates having the liquid crystal material disposed between the substrates.

6. A device as claimed in claim 1 wherein the liquid crystal material contains a dye.

7. A device as claimed in claim 5 wherein substantially transparent conducting films are deposited on the inner surfaces of said substrates.

8. A device as claimed in claim 1 which includes means for selectively addressing at least a part of the liquid crystal material to effect therein a selective variation in texture.

9. A device as claimed in claim 8 wherein said addressing means includes means for applying a magnetic, electrical or optical field to the material.

10. A device as claimed in claim 1 wherein Q represents an alkyl group having from 1 to 8 carbon atoms.

11. A device as claimed in claim 1 wherein Q represents the group —(CH$_2$)$_n$L.

12. A device as claimed in claim 1 wherein T is —CN and Q represents the group —(CH$_2$)$_n$OM'.

* * * * *